United States Patent [19]

Goldstein et al.

[11] Patent Number: 4,874,196
[45] Date of Patent: Oct. 17, 1989

[54] TRUCK COVER HAVING AN IMPROVED TELESCOPIC ARM ASSEMBLY

[75] Inventors: Harvey R. Goldstein; Edward N. Haddad, Jr., both of Worcester, Mass.

[73] Assignee: Pioneer Consolidated Corp., North Oxford, Mass.

[21] Appl. No.: 63,524

[22] Filed: Jun. 18, 1987

[51] Int. Cl.4 .......................... B60P 7/04; E04F 10/06
[52] U.S. Cl. ...................................... 296/98; 296/101; 160/71
[58] Field of Search ................. 296/98, 100, 112, 111, 296/113, 101, 136; 160/68, 71, 80

[56] References Cited

U.S. PATENT DOCUMENTS

| | | | |
|---|---|---|---|
| 1,750,285 | 5/1930 | Schuler | 160/71 |
| 2,959,447 | 11/1960 | Stebbins et al. | 296/136 X |
| 3,833,255 | 9/1974 | Logue | 296/101 |
| 3,910,629 | 10/1975 | Woodard | 296/137 |
| 3,942,830 | 3/1976 | Woodard | 296/105 |
| 3,975,047 | 8/1976 | McClellan | 296/100 |
| 4,023,857 | 5/1977 | Killion | 296/98 |
| 4,027,911 | 6/1977 | Johnson | 296/23 |
| 4,032,186 | 6/1977 | Pickering et al. | 296/100 |
| 4,046,416 | 10/1977 | Penner | 296/98 |
| 4,050,234 | 9/1977 | Richard | 296/98 |
| 4,088,234 | 5/1978 | Smith | 296/101 X |
| 4,095,840 | 6/1978 | Woodard | 296/100 |
| 4,157,202 | 6/1979 | Bachand | 296/100 |
| 4,189,178 | 2/1980 | Cramaro | 296/105 |
| 4,216,990 | 8/1980 | Mosgrove et al. | 296/213 |
| 4,295,262 | 10/1981 | Grote et al. | 29/462 |
| 4,341,416 | 7/1982 | Richard | 296/98 |
| 4,469,317 | 9/1984 | Grote et al. | 269/69 |
| 4,516,802 | 5/1985 | Compton | 296/98 |
| 4,518,194 | 5/1985 | Kirkham et al. | 296/100 |
| 4,640,331 | 2/1987 | Braun et al. | 303/9 X |

FOREIGN PATENT DOCUMENTS 2178499  2/1987  United Kingdom ............... 303/116

Primary Examiner—Andres Kashnikow
Assistant Examiner—Richard Potosnak
Attorney, Agent, or Firm—Weingarten, Schurgin, Gagnebin & Hayes

[57] ABSTRACT

A truck cover having an improved telescopic arm assembly for drawing a cover across an open topped truck body or other vessel or container. The assembly is powered by a pneumatic, hydraulic or other power source and comprises a pair of pivoting telescopic arms motivated by actuators The activators cause the telescopic arms to move pivotally from one end of the container to the opposite end and during the pivotal movement to cause the telescopic arms to retract as they move to a vertical position and to extend as they move from the vertical position to the opposite end of the container. The extension and retraction of the telescopic arms during pivotal movement from one end of the container to the opposite end causes a flexible cover carried by the upper ends of the telescopic arms to be drawn across the container in a low trajectory resulting in improved ease and safety of operation and reduced opportunity for damage to the flexible cover.

22 Claims, 5 Drawing Sheets

TRUCK COVER HAVING AN IMPROVED TELESCOPIC ARM ASSEMBLY

BACKGROUND OF THE INVENTION

A variety of cover assemblies have been developed to prevent particulate matter escaping from open topped truck bodies. Generally, these assemblies comprise a pair of similar arms, pivotally attached to the approximate midpoint of the lower truck body sides. A cover is located between the upper ends of the arms, and means are provided for causing the arms to move pivotally and draw the cover lengthwise across and over the truck body. These cover assemblies are not entirely satisfactory due to the fixed length of the swinging arms once attached to the truck body. Some available assemblies incorporate arms which are axially adjustable to adjust the length of the arms to accomodate different length truck bodies, but do not provide for extension or retraction of the arms during operation of the assembly. U.S. Pat. Nos. 4,050,734 and 4,341,416 disclose such static adjustable arms. The result is a high clearance of the truck body by the cover as the cover is drawn arcuately lengthwise across the truck body. The highest clearance occurs when the swinging arms reach a vertical position. This high clearance is disadvantageous as the cover may be caught by the wind or other objects and be damaged or cause damage. In addition, the assembly may only be used where there is sufficient vertical clearance to permit operation of the similar swinging arms. Another disadvantage is that the assembly may be employed only where attachment of the swinging arms to the approximate midpoint of the side of the truck body is possible.

SUMMARY OF THE INVENTION

The present invention provides an improved truck cover having a telescopic arm assembly for drawing a cover across and over a truck body or other vessel or container having an upwardly open body. Two telescopic arms are pivotally attached to the container. Motive means cause pivotal movement of the telescopic arms from one end of the container to the opposite end. In one embodiment, the motive means comprise hydraulically powered cylinders attached to the container and linked to the telescopic arms. The telescopic arms retract during pivotal movement from one end of the container to a vertical position and extend during pivotal movement from the vertical to the opposite end of the container. Thus, minimal clearance of the container is ensured as the cover or cover mechanism is drawn across the container.

DESCRIPTION OF THE DRAWINGS

The invention will be more fully understood from the following detailed description, taken in conjunction with the accompanying drawings, in which.

DETAILED DESCRIPTION OF THE INVENTION

Figure 1A:
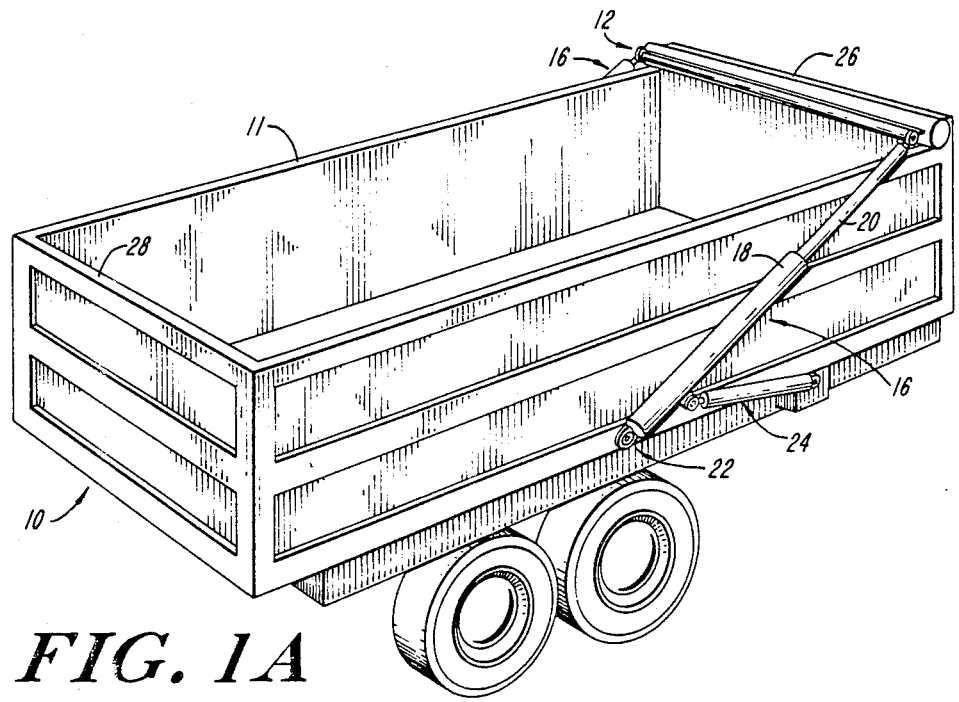
FIG. 1A is a perspective view of a truck body or trailer with a truck cover embodying the invention mounted thereon and shown in an uncovered position.

Referring to the drawings and particularly to FIGS. 1A-1C and FIG. 2 an upwardly open truck body or trailer 10 having an upper edge 11 is illustrated. A cover mechanism 12 houses a flexible cover 14 of sufficient size to cover the trailer. The cover mechanism 12 may be mounted on an end of the trailer, with the free end of the cover 14 affixed to the upper free ends of a pair of telescopic arms 16. Alternatively, the cover mechanism may be mounted to the upper ends of the arms, and the free end of the cover attached to an end of the trailer. The cover maintains loose articles in the trailer. The telescopic arms 16 have a lower stage 18 and a narrower axially extendable upper stage 20. The telescopic arms 16 are pivotally mounted respectively, to the approximate lower midpoint 22 of each side of the trailer. The arms 16 may be mounted away from the approximate lower midpoint, as the assembly of the present invention will compensate for the off-center pivot point. A hydraulic actuator 24 is mounted on each side of the trailer and is linked to a respective one of the telescopic arms 16. In an alternative embodiment, the telescopic arms are slaved together and are operated by a single actuator.

Figure 1B:
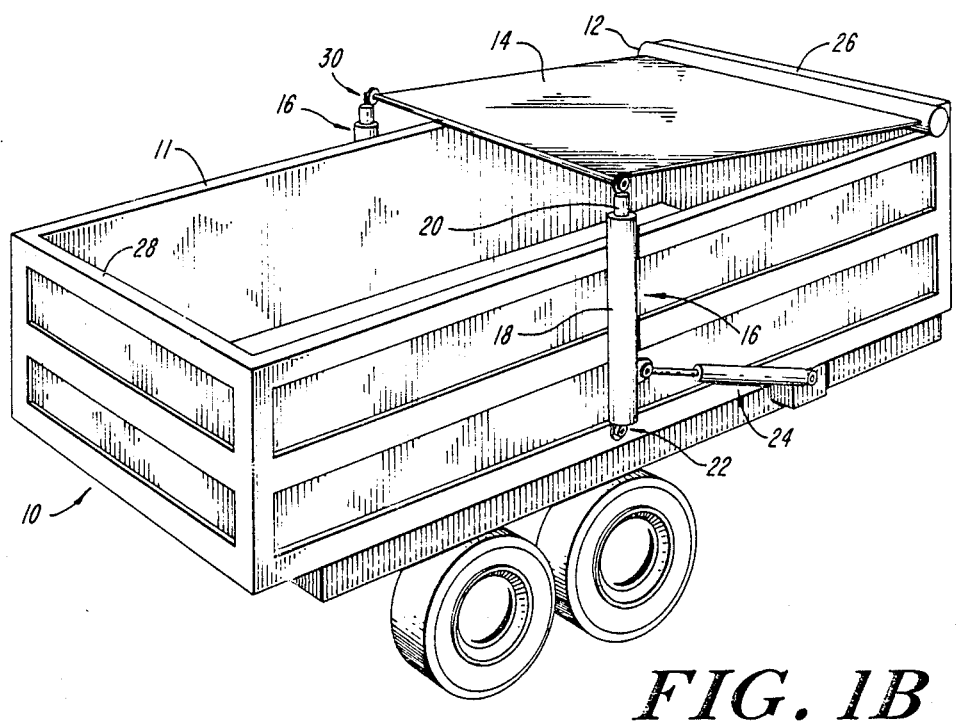
FIG. 1B is a perspective view of the truck cover of FIG. 1A showing the telescopic arm assembly in the intermediate retracted position.
Figure 1C:
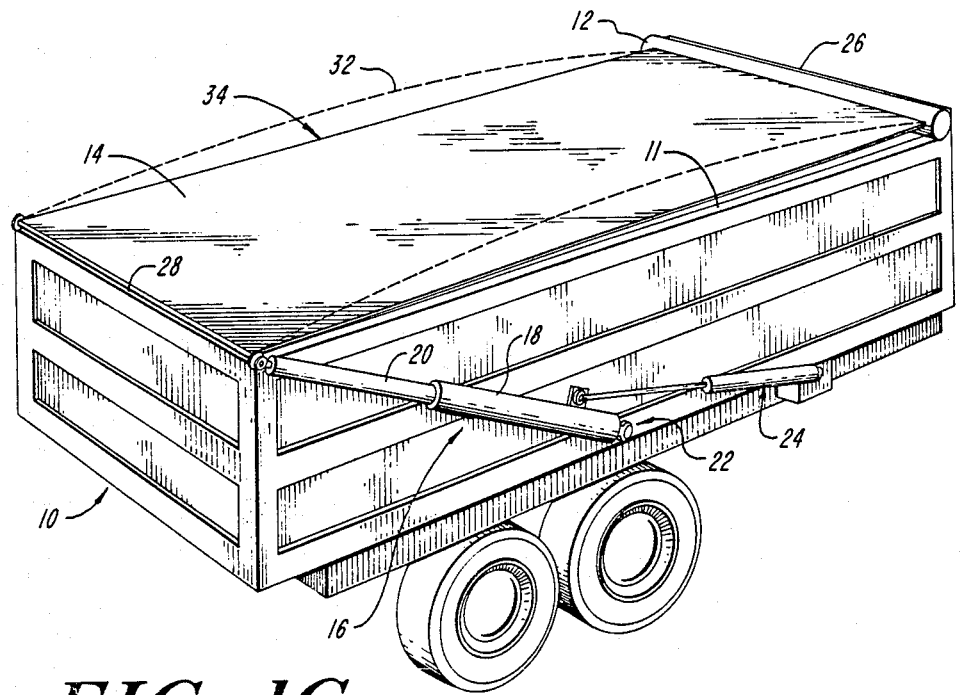
FIG. 1C is a perspective view of the truck cover of FIG. 1A shown in the covered position.

As the actuators 24 extend and pivotally move said telescopic arms 16 from one end 26 of the trailer to the opposite end 28, the cover is drawn lengthwise across the trailer. During pivotal movement, the telescopic arms 16 retract as they swing from one end 26 of the trailer, as shown in FIG. 1A, to a vertical position 30, as shown in FIG. 1B. At the vertical position 30, the telescopic arms 16 are more fully retracted. As the telescopic arms 16 move pivotally from the vertical position 30, as shown in FIG. 1B, to the opposite end 28 of the trailer, as shown in FIG. 1C, the telescopic arms 16 extend until the opposite end 28 of the trailer is reached. When the telescopic arm assembly is operated in reverse, the actuators 24 retract and pivotally move the telescopic arms 16 in the opposite direction. The telescopic arms 16 retract as they move pivotally from one end of the trailer 28 to the vertical position 30 and extend as they move pivotally from the vertical position 30 to the opposite end of the trailer 26. During pivotal movement, a minor portion of telescopic arm 16 extends above upper edge 11 of trailer 10.

In FIG. 1C, it will be noted that the arc 32 traced by the movement of the upper ends of the telescopic arms 16 is very shallow in relation to the upper edge 34 of the side wall of the trailer.

Figure 2:
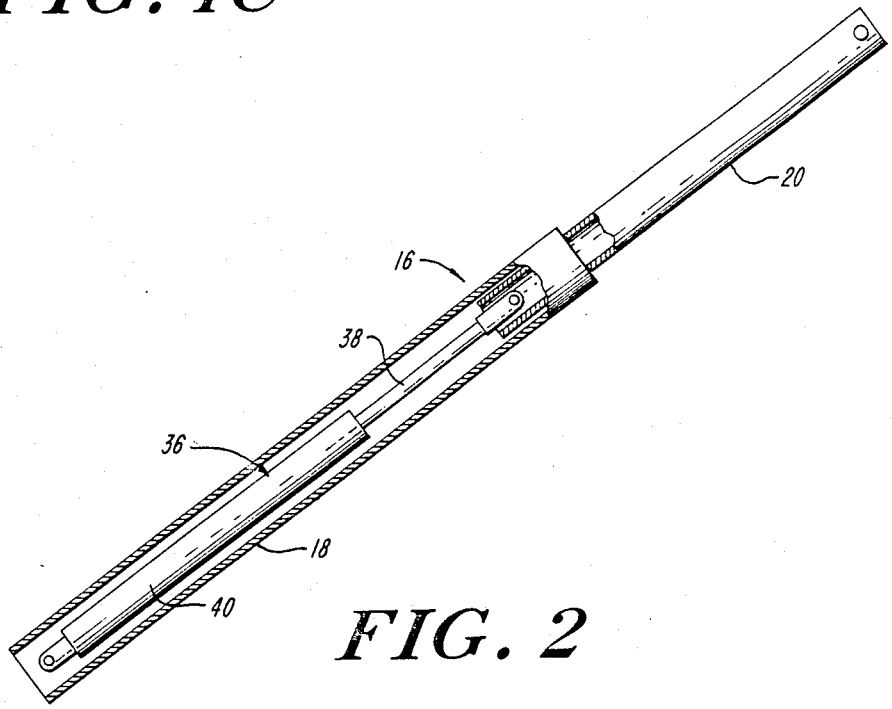
FIG. 2 is a partly sectional view of a telescopic arm used in the invention.

Referring now to FIG. 2, an embodiment of one of the telescopic arms is illustrated. The telescopic arm 16 comprises a multi-stage hydraulic cylinder 36 encased in a lower stage 18 shown in cross section and linked to an upper stage 20. The lower stage 18 is attached to a truck body, or other vessel or container. As the telescopic arm pivots about its fixed point from a starting position at one end of the container towards a vertical position, the upper arm 38 of the multi-stage hydraulic cylinder 36 retracts into the lower arm 40, drawing the upper stage 20 of the telescopic arm 16 into the lower stage 18. When the telscopic arms 16 moves pivotally from the vertical to the opposite end of the container, the upper arm 38 of the multi-stage hydraulic cylinder 36 extends from the lower arm 40 pushing the upper stage 20 of the telescopic arms 16 in an outwardly direction relative to the lower stage 18. The telescopic arm illustrated in FIG. 3 may be powered by means comprising a hydraulic system, a servo motor, a pneumatic system or any other suitable system known to one of ordinary skill in the art.

Figure 3:
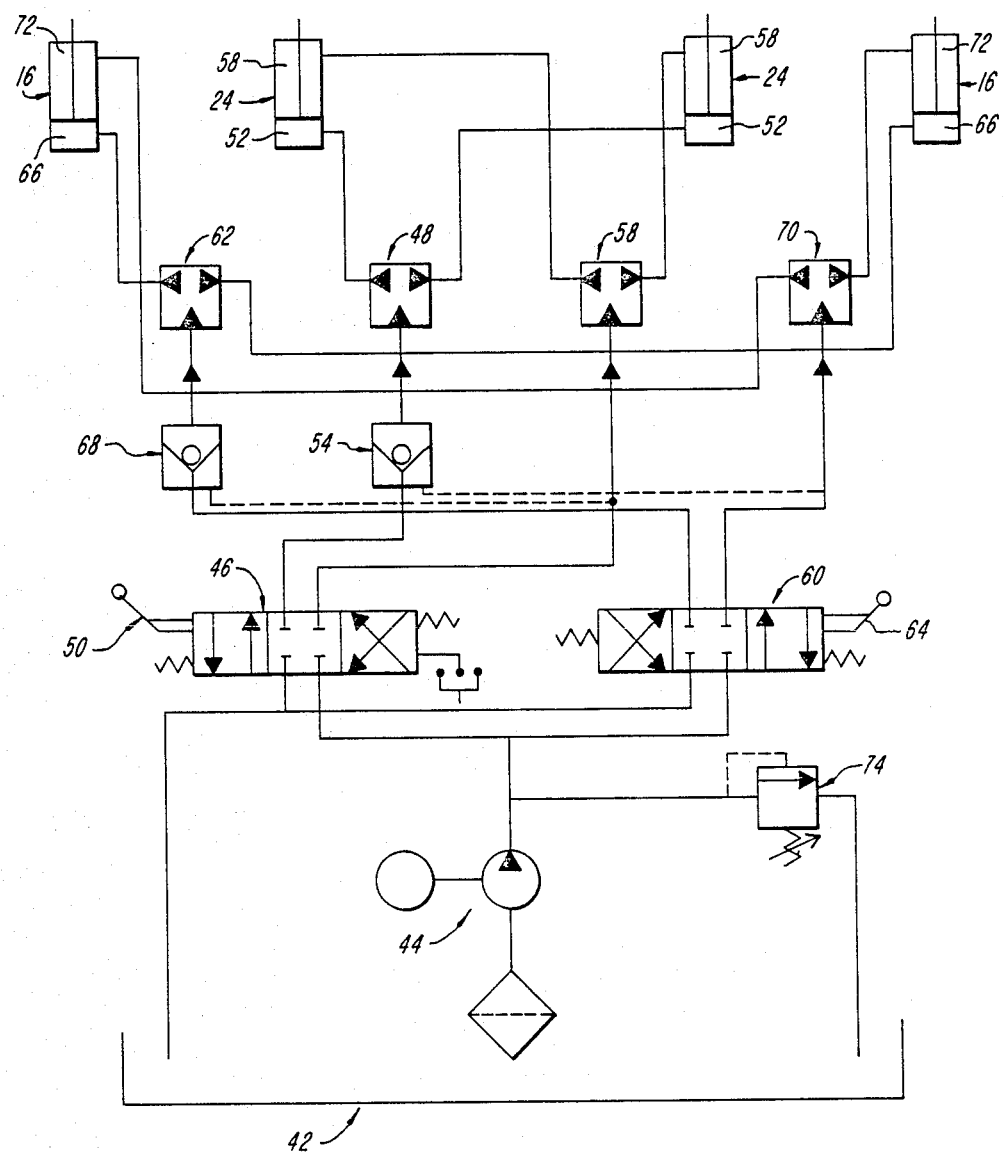
FIG. 3 is a schematic diagram of a hydraulic system employed in the invention to power the telescopic arm assembly.

A hydraulic system for powering the cover assembly is illustrated in FIG. 3. A tank 42 of suitable size stores hydraulic fluid for use by a motor driven pump 44. A first three-position four-way valve 46 regulates the flow of hydraulic fluid through a first flow divider 48 such as a 50/50 flow divider to the two actuators 24. Moving a first lever 50 into a first position causes the hydraulic fluid to flow through the first flow divider 48 to the lower chambers 52 of the actuators 24 urging the actuators to extend. A first check valve 54 prohibits undesired backflow of the hydraulic fluid and prevents unwanted or premature retraction of the actuators. Moving the first lever 50 into a second position causes the hydraulic fluid to flow through a second flow divider 56 to the upper chambers 58 of the actuators 24, urging them to retract. A second three-position four-way valve 60 regulates the flow of hydraulic fluid through a third flow divider 62 to the two telescopic arms 16. Moving a second lever 64 into a first position causes the hydraulic fluid to flow through the third flow divider 62 to the lower chambers 66 of the telescopic arms 16, urging the telescopic arms 16 to extend. A second check valve 68 prohibits undesired backflow of the hydraulic fluid and prevents unwanted premature retraction of the telescopic arms. Moving the second lever 64 into a second position causes the hydraulic fluid to flow through a fourth flow divider 70 to the upper chambers 72 of the telescopic arms 16, urging the telescopic arms 16 to retract. An adjustable relief valve 74 prevents overpressurization of the hydraulic system.

Figure 4:
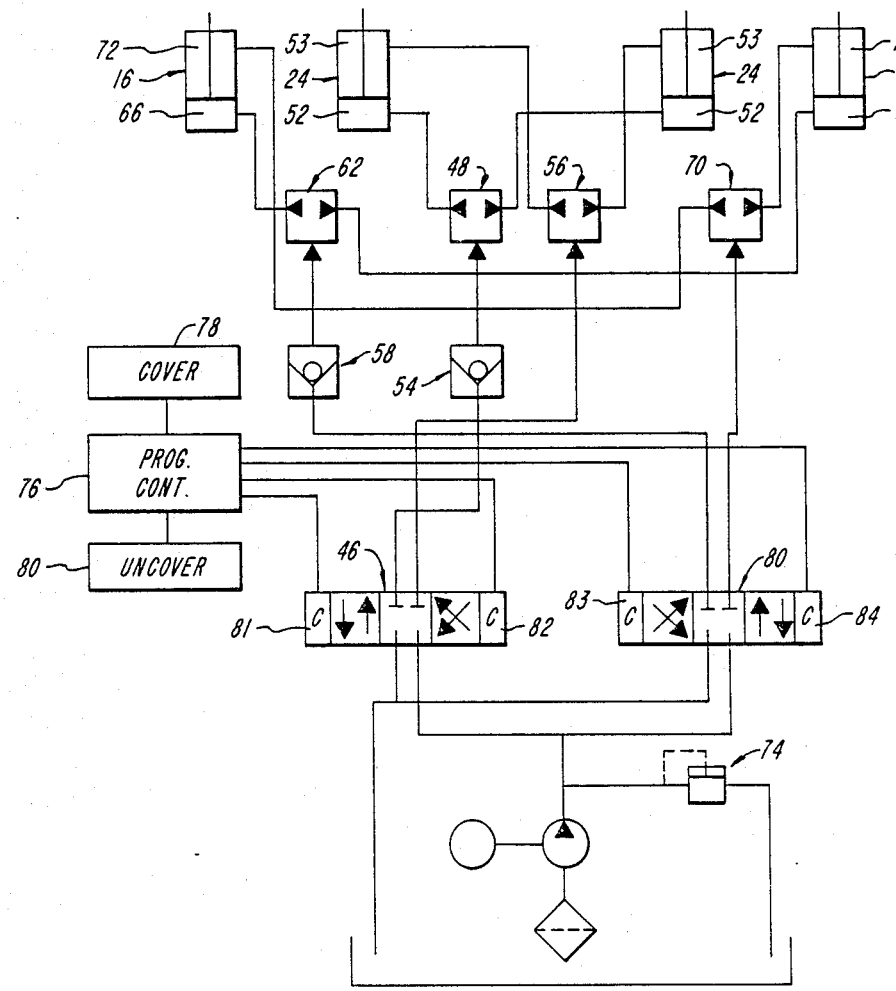
FIG. 4 is a schematic diagram of a control system for automatic operation of the assembly.

An alternative system for powering the cover assembly is illustrated in FIG. 4. This embodiment provides for the automatic concurrent operation of the actuators 24 and telescopic arms 16. A programmable controller 76 is connected to four solenoids 81, 82, 83 and 84 which in effect replace the first and second levers 50, 64 of FIG. 3 and are tied to the first and second three-position four-way valves 46 and 60 respectively. Operation of the programmable controller 76 activates the solenoids 81, 82, 83 and 84 and causes the two three-position four-way valves 46 and 60 to operate in a preset sequence to cause the actuators 24 and telescopic arms 16 to extend and retract in cooperation. The cover is thereby motivated to cover or uncover the truck body in a very low trajectory relative to the upper edge of the side of the container. The programmable controller is activated by a "cover" switch 78 and an "uncover" switch 80. Alternatively, the programmable controller may be activated by a lever or any other suitable mechanism known to one of ordinary skill in the art.

Figure 5:
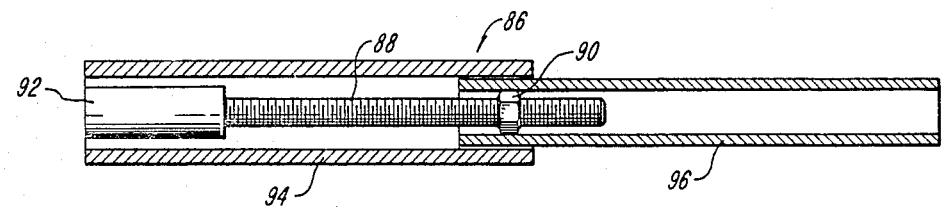
FIG. 5 is a partly sectional view of a servo assisted telescopic arm used in the invention.

Referring now to FIG. 5, a second embodiment of one of the telescopic arms is illustrated. The telescopic arm 86 of FIG. 5 comprises a lead screw 88 a threaded nut 90 and a servo motor 92. The servo motor 92 is housed at the lower end of the lower arm 94 of the telescopic arm 86. The lead screw 88 is connected to the servo motor 92 and extends from the lower arm 94 into the upper arm 96 of the telescopic arm 86. The threaded nut 90 is fixed to the inner wall of the upper arm 96. Operation of the servo motor 92 causes the lead screw 88 to rotate along its longitudinal axis.

Rotation of the lead screw 88 in one direction urges the threaded nut 90 along the lead screw 88 towards the servo motor 92 causing the upper arm 96 to retract into the lower arm 94. Activating the servo motor 92 to cause rotation of the lead screw 88 in the opposite direction causes the lead screw 88 and threaded nut 90 to cooperate to cause the upper arm 96 to extend from the lower arm 94. In a typical installation, the servo motor 92 is connected to and controlled by a programmable controller 76.

Figure 6:
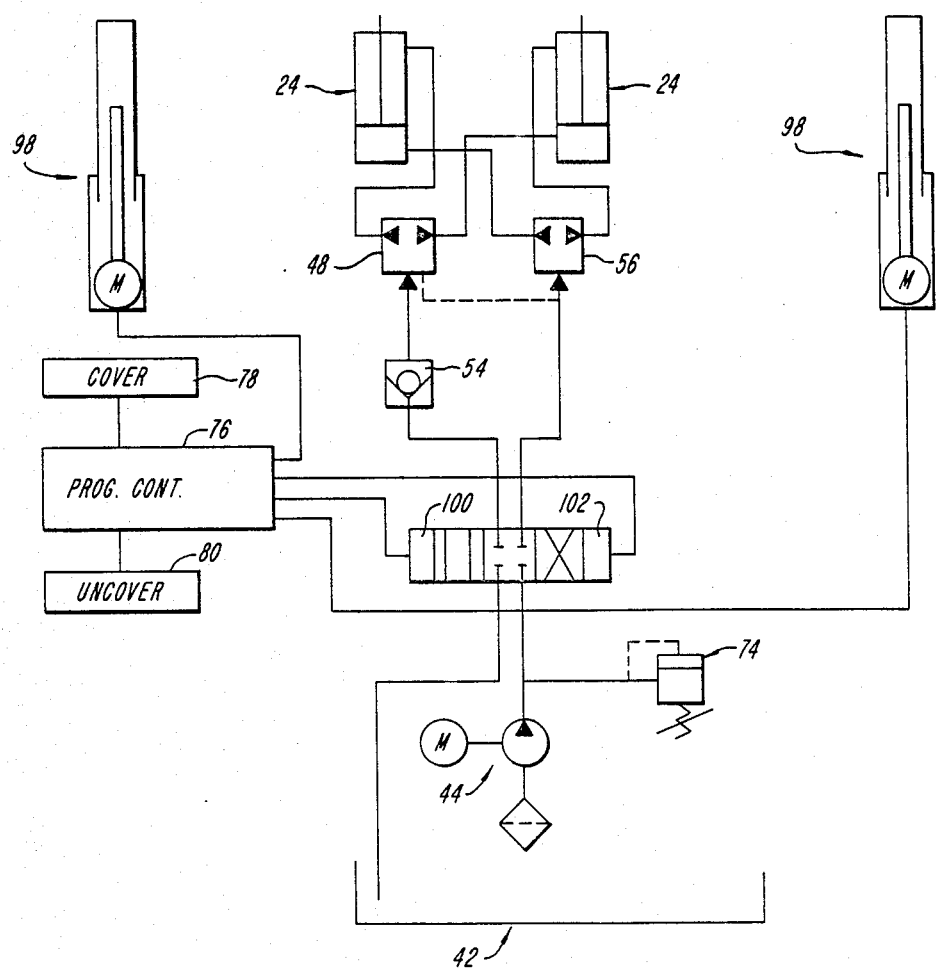
FIG. 6 is a schematic diagram of an alternative control system for automatic operation of the assembly.

Referring now to FIG. 6, a third system for powering the cover assembly is illustrated. A programmable controller 76 as shown in FIG. 4 is connected to two of the telescopic arms 98 of FIG. 5 and to first and second solenoids 100 and 102. The first and second solenoids are tied to the first three-position four-way valve 46 of FIG. 4. The first three-position four-way valve 46 is connected to a hydraulic actuating system comprising a tank 42, adjustable relief valve 74, pump 44, first check valve 54, first and second flow dividers 48, 56, and actuators 24. The programmable controller 76 is activated by a "cover" switch 78 and an "uncover" switch 80.

Depressing the "cover" 78 and "uncover" 80 switches activates the programmable controller 76 which instructs the telescopic arms 98, the first three-position four-way valve 46 and the first and second solenoids 100 and 102 to cooperate with the hydraulic actuating system to automatically draw the cover 14 across or over to cover or uncover respectively the truck body at a very low trajectory.

Numerous modifications and variations of the present invention are possible in light of the above teachings. It is, therefore, to be understood that within the scope of the appended claims, the present invention may be practiced otherwise than as specifically described hereinabove.

What is claimed is:

1. Apparatus for drawing a flexible cover over an upwardly open container body having an upper edge and for maintaining loose articles in said container body, said apparatus comprising:

a flexible cover of a size substantially cover the open container body;

a pair of telescopic arms pivotally attached at one end to the container and connected at the other end to the cover, constructed and arranged to maintain the cover in close proximity to said upper edge;

means for pivotally moving said telescopic arms to cause said connected ends to traverse from one end of the container body to an opposite end; and means for retracting said telescopic arms during pivotal movement from one end of the container body to a first pivotal position and for extending said telescopic arms during pivotal movement from the first pivotal position to the opposite end of the container body, wherein a minor portion of said telescopic arms extends above said upper edge at any intermediate pivotal position between said one end and said opposite end of the container body.

2. The apparatus of claim 1 wherein said pivotally moving means includes a pair of actuators each having one end attached to the container and another end attached to a respective telescopic arm.

3. The apparatus of claim 2 further comprising a power source cooperating with said actuators to cause pivotal movement of said telescopic arms.

4. The apparatus of claim 3 wherein said power source also cooperates with said telescopic arms to cause extension and retraction thereof.

5. The apparatus of claim 4 wherein said power source is a hydraulic system.

6. The apparatus of claim 4 wherein said power source is a pneumatic system.

7. The apparatus of claim 5 wherein said hydraulic system comprises:
   a tank containing hydraulic fluid;
   pump means for circulating said hydraulic fluid through said hydraulic system;
   first and second hydraulic fluid circuits communicating with said pump means;
   wherein said first hydraulic fluid circuit controls the flow of said hydraulic fluid to said actuators and includes
   a three-position valve,
   a check valve connected to said three-position valve,
   a first flow divider connected to said check valve and to said actuators, and
   a second flow divider connected to said actuators and to said three-position valve;
   and wherein said second hydraulic fluid circuit controls the flow of hydraulic fluid to said telescopic arms and includes
   a three-position valve connected to said pump,
   a check valve connected to said three-position valve,
   a first flow divider connected to said check valve and to said telescopic arms, and
   a second flow divider connected to said telescopic arms and to said three-position valve.

8. The apparatus of claim 7 wherein said hydraulic power source includes solenoid means for activating said three-position valves of said first and second hydraulic circuits.

9. The apparatus of claim 8 wherein said hydraulic power source includes a programmable controller, cooperating with said solenoid means for automatically causing said actuators and said telescopic arms to extend and retract in preset sequence.

10. The apparatus of claim 9 wherein said hydraulic power source includes first and second switches connected to said programmable controller.

11. The apparatus of claim 7 wherein said three position valves are three-position four-way valves.

12. The apparatus of claim 7 wherein said flow dividers are 50/50 flow dividers for dividing the hydraulic fluid exiting said dividers substantially equally between two outflow channels.

13. The apparatus of claim 9 wherein said programmable controller includes a lever for activating said programmable controller.

14. The apparatus of claim 4 wherein each of said telescopic arms comprises:
   a lower arm;
   an upper arm;
   one of said arms capable of telescoping into the other arm;
   a lead screw connected to one of said arms;
   a threaded nut connected to the other of said arms;
   means for causing rotation of said lead screw to cause said nut and the arm connected thereto to extend or retract in accordance with the direction of rotation of the lead screw.

15. The apparatus of claim 14 wherein said rotation means comprises a servo motor coupled to said lead screw.

16. The apparatus of claim 15 wherein said servo motor is controlled by a programmable controller.

17. The apparatus of claim 1 wherein each of said telescopic arms comprises at least two slideably and adjustably connected cylindrical members of different diameters and defining an internal cavity, and wherein said means for retracting and extending is partially disposed substantially within said cavity.

18. The apparatus of claim 14 wherein at least one of said telescopic arms comprises a hollow cylindrical body and wherein said lead screw and said threaded nut are disposed substantially within said at least one telescopic arm.

19. Apparatus for drawing a flexible cover across an upwardly open container body having upper edge, said apparatus comprising:
   a flexible cover for maintaining loose articles in said container body;
   at least one telescopic arm pivotally attached at a first end thereof to the container and having at a second end thereof means for connecting said cover to said at least one telescopic arm;
   means connected to said at least one telescopic arm and to the container body for causing pivotal movement of said telescopic arm second end from a first end of the container body to a second end thereof; and
   means for retracting said at least one telescopic arm during pivotal movement thereof from a first end of the container to a first pivotal position, and for causing extension of said at least one telescopic arm during pivotal movement from the first pivotal position to a second end of the container, wherein during pivotal movement, a minor portion of said telescopic arm extends above said upper edge at any intermediate position between said first end and said second end of the container.

20. The apparatus of claim 19 wherein said cover connecting means comprises a rod connected to said telescopic arm second end at an angle of approximately 90° and wherein said cover is directly attached to said rod.

21. The apparatus of claim 19 wherein said pivotally moving means comprises at least one telescopic actuating arm attached at a first end thereof to said at least one telescopic arm and attached at a second end thereof to said container.

22. The apparatus of claim 21 further comprising a power source cooperating with said at least one telescopic actuating arm to cause pivotal movement of said at least one telescopic arm and connected at said at least one telescopic arm to cause retraction and extension thereof.

* * * * *